United States Patent
Dunn, Jr.

[15] 3,699,206
[45] Oct. 17, 1972

[54] PROCESS FOR BENEFICIATION OF TITANIFEROUS ORES

[72] Inventor: Wendell E. Dunn, Jr., Sydney, Australia

[73] Assignee: Wendell E. Dunn Inc., Sydney, Australia

[22] Filed: March 23, 1970

[21] Appl. No.: 21,686

[52] U.S. Cl. .................423/74, 423/659, 423/79, 75/1
[51] Int. Cl. ....................C01g 23/04, C01g 49/10
[58] Field of Search .....23/87 R, 87 T, 202 R, 202 V, 23/1 F; 106/300; 75/1, 1 T

[56] References Cited

UNITED STATES PATENTS

| | | | |
|---|---|---|---|
| 2,933,373 | 4/1960 | Love et al. | 23/202 R |
| 2,752,300 | 6/1956 | Cooper | 23/202 R X |
| 2,747,987 | 5/1956 | Daubenspeck et al. | 23/202 R X |
| 3,291,599 | 12/1966 | Reeves | 23/202 R X |
| 2,120,602 | 6/1938 | Donaldson | 23/87 T UX |

Primary Examiner—Edward Stern
Attorney—Samuel V. Abramo

[57] ABSTRACT

Process for beneficiating titaniferous ores to produce essentially pure titanium dioxide comprising alternatingly contacting the ore in a gas-solids reactor with carbon monoxide for a short period of time and then with chlorine for a short period of time and then repeating the alternate carbonylation and chlorination steps at temperatures of 700 to 1,150° C. under fluidizing conditions; converting iron oxide and oxides of metals other than titanium in the ore to iron and other metal chlorides and removing same by volatilization. The titanium dioxide produced is useful as a starting material for the preparation of titanium dioxide pigment.

12 Claims, 1 Drawing Figure

*Process for Beneficiation of Titaniferous Ores*

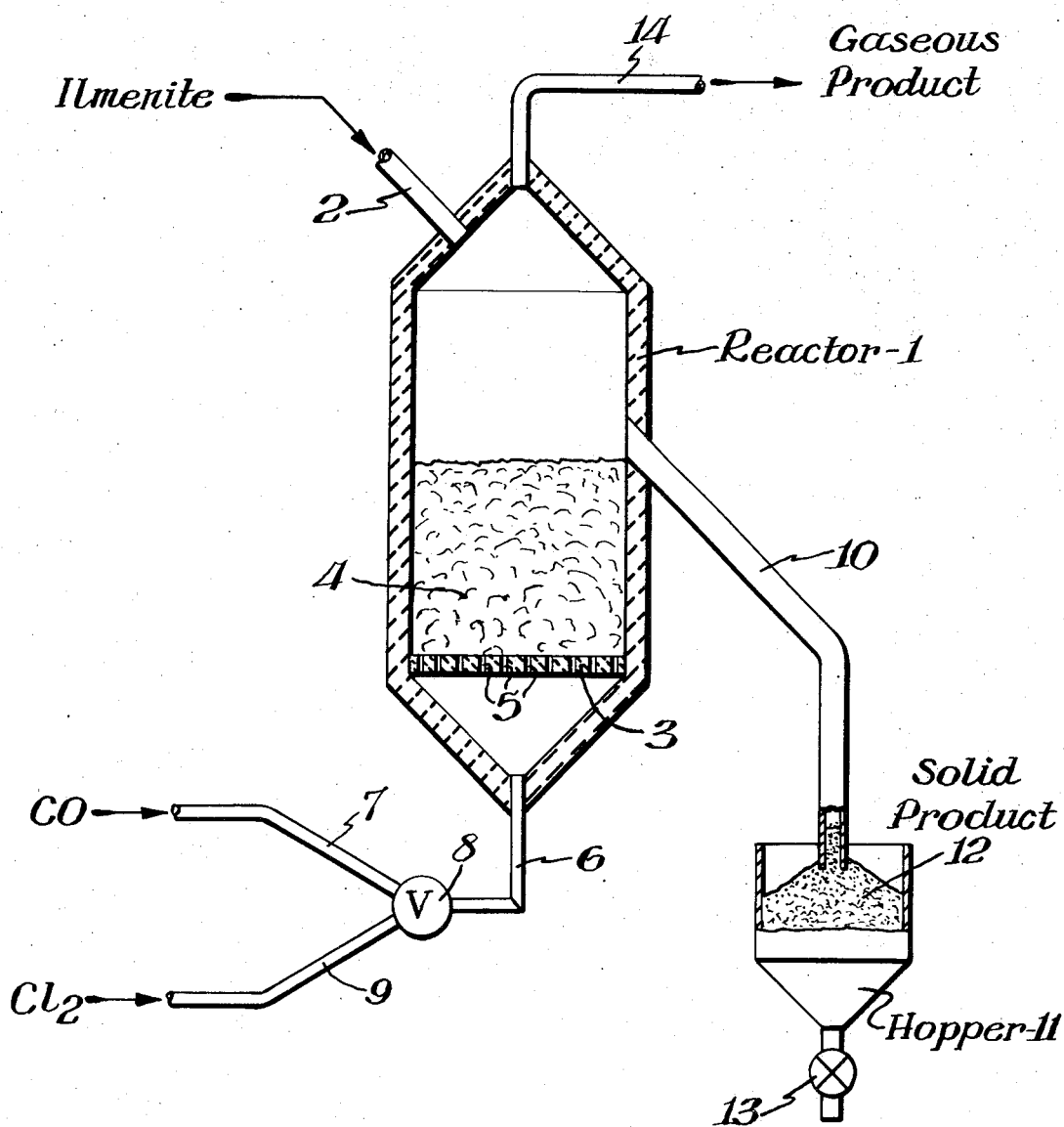

PROCESS FOR BENEFICIATION OF TITANIFEROUS ORES

FIELD OF THE INVENTION

This invention relates to a process for the treatment of titaniferous ores to produce titanium dioxide.

SUMMARY OF THE INVENTION

This invention is directed to a process for beneficiating titaniferous ore containing titanium dioxide mixed with iron oxides and minor amounts of other metal oxides, which comprises contacting, in a gas-solids reactor under fluidizing conditions, a bed of titaniferous ore at elevated temperatures with at least one carbon monoxide-chlorine cycle, said cycle comprising contacting said ore with carbon monoxide for a period of time and then with chlorine gas for a period of time and simultaneously withdrawing vaporized chlorides of metals other than titanium.

This process produces an essentially pure iron-free titanium dioxide product which is useful as an intermediate for the production of titanium dioxide pigment useful as a pigment for paints and as a filler for rubber and paper.

DESCRIPTION OF THE PREFERRED EMBODIMENTS

This invention is directed to an improved chlorination process for beneficiating titaniferous ores, comprising separately and alternately contacting, at elevated temperatures, a bed of titaniferous ore in a reactor with carbon monoxide and with chlorine. The contacting steps can be repeated a plurality of times. The reaction is conducted at elevated temperatures so that iron chlorides simultaneously with other metal chloride by-products are removed as a vapor. This improved process comprises alternatingly contacting the ore with a cycle comprising treating the ore first with carbon monoxide for a short period of time and then with chlorine for a short period of time. The ore is contacted with this alternating cycle at least once to produce a beneficiated ore product having 95 percent or more $TiO_2$ and 0.5 percent or less iron (determined as $Fe_2O_3$).

Previous to my invention, chlorination processes for the beneficiation of titaniferous ores to a high grade product containing 95 percent or more of titanium dioxide were deficient. These prior processes resulted in the loss of titanium values. The long chlorination time required to achieve this desired $TiO_2$ concentration and a low iron concentration resulted in a porous product having a large proportion of $TiO_2$ fines. Processing of this product to produce $TiO_2$ pigments results in a further loss of titanium values.

This invention is directed to an improved chlorination process for removing iron from a titaniferous ore to produce an essentially pure titanium dioxide. This process consists of reacting the ore at an elevated temperature in the range of 700–1,150°C. in a reactor first with carbon monoxide and then with chlorine and then repeating the separate carbonylation step and the chlorination step until the desired iron content is obtained. The iron and other metal oxide contaminants in the ore are converted to chlorides which are removed by distillation from the reactor. In other words, the improvement herein comprises repeatedly contacting a bed of ore, heated to an elevated temperature, in a gas-solids reactor with a carbon monoxide-chlorine cycle comprising contacting the ore with the carbon monoxide for up to 5 to 30 minutes or more, then contacting the reduced bed of ore with chlorine for about up to 5 to 30 minutes or more and then repeating the carbon monoxide-chlorine cycle a plurality of times until the iron content of the reaction mixture is decreased to approximately 0.2 percent, by weight or less. Preferably, the carbon monoxide-chlorine cycle comprises contacting the ore with carbon monoxide for about 20 minutes and chlorine for about 10 minutes. Generally, a product having the low iron content desired is obtained in four carbonylation-chlorination cycles.

The reactor can be constructed of quartz or a ceramic such as fire brick and the like. This material of construction preferably should be capable of withstanding contact with a mixture containing chlorine, titanium tetrachloride, ferrous and ferric chloride, carbon monoxide and oxygen at temperatures in excess of 1200° C.

The chlorine and carbon monoxide, preferably, are introduced into the reactor at a point below the bed of ore. The feed rate of the chlorine feed and carbon monoxide feed into the reactor is maintained such that the chlorine and carbon monoxide are consumed within the bed of ore and a fluidization action of the bed or ore is produced by these gases. Depending upon the depth of the ore bed which preferably is 0.1 to 5 feet and most preferred is to 0.1 to 1 foot, the rate of flow of chlorine and carbon monoxide, preferably, are 0.19 to 2.0 ft./sec. and most preferred 0.19 to 1.25 ft./sec. The flow rate of gases in the reactor is one which produces a superficial flow rate of hot gases through the reactor at reaction temperatures of about 0.25 ft./sec. However, lower or higher rates are operable. The chlorine and carbon monoxide can be diluted with gases such as nitrogen and carbon monoxide. When a diluent is used, the above flow rates are used.

The ore can be contacted with carbon monoxide (carbonylation) conveniently for a period of time of 1 to 20 minutes per cycle at the above described rates. Similarly, chlorine (chlorination) is passed through the ore for a period of time of 1 to 10 minutes.

Preferably, the ore introduced into the reactor should have an average particle size of at least −20 mesh and preferably 90 percent -75 mesh; however, ore having a larger or smaller average particle size can be used.

The product produced by the process of this invention is essentially a pure, iron oxide-free titanium dioxide. By essentially pure, iron oxide-free titanium dioxide it is meant a product containing 95 percent or more titanium dioxide and preferably, by weight, 0.5 or less iron oxide. This product can contain small amounts of chlorinatable metal oxides (generally less than 0.2 percent by weight and preferably 0.1 percent or less) with the remainder being non-chlorinatable silicates and the like.

Referring to the drawing:

The FIGURE is a diagrammatic view of the process.

In the figure, ore is introduced into the reactor 1 through inlet 2. The ore rests n a perforated plate 3 or fritted disc (not shown) to form a bed or ore 4. The perforated plate has holes 5 which are, preferably, 1/32 to 3/32 inch in diameter. The reactor is composed of corrosion-resistant materials such as quartz, ceramic and the like, capable of withstanding contact with chlorine at temperatures in excess of 1,250° C. The reaction is preferably operated at temperatures of 700°–1150° C. or higher, and most preferred at 950°–1050°C. The chlorination reaction can be performed in any standard gas-solids contactor, preferably in a vertical position. The contents of the reactor are agitated by the reactant gases introduced into the bottom of the reactor through gas feed line 6.

Alternatingly, carbon monoxide is admitted to the gas feed line through the inlet tube 7 by means of the three-way valve 8 and chlorine is admitted to the gas feed line by means of the inlet tube 9 into said three-way valve. Gaseous products consisting of iron chlorides, other metal chlorides, carbon monoxide and diluent gases are withdrawn from the reactor via outlet tube 14. The solid product is conveyed by the side arm pipe 10 to a hopper 11 where the beneficiated product 12 is allowed to cool. The hopper is emptied by means of valve 13. The product can be conveyed to a separator (not shown) to remove partially chlorinated ore containing greater than 0.5 percent, by weight $Fe_2O_3$, calculated as $Fe_2O_3$.

As stated above, prior to my invention, chlorination beneficiation processes of titaniferous ores were undesirable since a large amount of the titanium values were lost. In these prior processes, beneficiated ore was contacted with chlorine a considerable length of time to achieve the desired level of iron and other metal contaminants. The conditions in these prior art processes produced considerable $TiO_2$ with the result being a loss of titanium values. Concomitantly, a relatively more porous $TiO_2$ product was produced having a relatively larger amount of $TiO_2$ fines. A product which is porous and contains a large amount of fines is undesirable since its use in the chlorination process for the production of titanium dioxide pigments further results in the loss of titanium values.

My process is believed to minimize the loss of titanium values because it converts the iron contaminant into a more readily chlorinatable form by contacting the titaniferous ore alternately with carbon monoxide and then with chlorine and repeating the cycle of carbon monoxide and chlorine.

The following Examples further illustrate the invention:

In a reactor having a volume of about 25 cm., electrically heated to 1,000° C., was placed 20 g. of Westralian Sands (a West Australian weathered titaniferous deposit) ilmenite ore. This ore was subjected to intermittent chlorination and carbonylation, by alternately passing chlorine and carbon monoxide through the ore. By-product iron chlorides and other metal chlorides were removed from the reactor as vapor. The Examples given below with increasing numbers of cycles of carbon dioxide diluted carbon monoxide and carbon dioxide diluted chlorine illustrate the iron removal progression with the preservation of $TiO_2$ values. A cycle consists of passing through the ore diluted carbon monoxide (30 mmols/min. CO + 30 mmols/min. $CO_2$) as the reducing phase for a period of 20 minutes and then carbon dioxide diluted chlorine (30 mmols/min. $Cl_2$ + 30 mmols/min. $CO_2$) as the chlorination phase for a period of about 20 minutes.

| | Cycles | G $Fe_2O_3$ | G $TiO_2$ | % $TiO_2$ |
|---|---|---|---|---|
| Example 1 | 2 | 2.452 | 11.82 | 75.8 |
| Example 2 | 3 | 1.225 | 11.73 | 84.4 |
| Example 3 | 4 | .200 | 11.78 | 94.4 |
| Example 4 | 12 | .028 | 11.66 | 96.9 |
| Example 5 | 16 | .026 | 11.71 | 97.5 |

It is readily apparent that the optimum number of carbon monoxide-chlorine cycles is 3 to 20 and most preferred is 3 to 12.

The process of this invention can be used for titaniferous ores obtained from other sources.

The product can be cooled under reducing conditions, for example, the product can be cooled under carbon monoxide or methane to the temperature where residual iron is reduced to magnetic FeO or $Fe_3O_4$, and conveniently the cooling is to room temperature. The cooled reaction product of Examples 1 and 2 can be passed through a conventional magnetic separator to effect a separation into a first non-magnetic fraction containing less than 0.5 percent iron and a second magnetic fraction. The magnetic fraction can be recycled in the process. The non-magnetic fraction is an essentially pure titanium dioxide product. The non-magnetic fraction can be passed through an air-tabling device which passes a stream of air through it to separate the less dense particles from the denser, essentially pure titanium dioxide product.

Alternately, the product produced by the process of this invention can be separated into an essentially pure product fraction and an iron-containing fraction by density classification without cooling under carbon monoxide.

The separation process can be conducted with a water leaching step which can be conveniently used with ores containing calcium. Calcium when present in the ore is converted into calcium chloride which is not vaporized and removed at the reaction temperatures. The presence of calcium chloride is undesirable because it decreases the flow properties of the product, especially in he presence of atmospheric moisture due to its hydroscopic nature. The leaching step consists of contacting the essentially pure titanium dioxide product fraction with water followed by drying.

The product produced by this reaction is off-white to light yellow in color. The product has a surface area of 0.1–0.5 m²/g. and does not absorb $H_2O$ or bind hydroxyls to its Ti surface.

As stated hereinabove, the titanium dioxide products produced by the process of this invention are useful as an intermediate for titanium dioxide pigment. The product can be used directly as a pigment. The product is also useful as a welding flux and in this use is applied as a coating to welding rods.

The foregoing detailed description has been given for clarity of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A process for the beneficiation of a titaniferous ore to produce essentially pure titanium dioxide, which comprises contacting a bed of the ore having a depth in the range of 0.1 to 5 feet in a gas solids reactor at a temperature in the range of 700° to 1,090° C. with at least three carbon monoxide-chlorine cycles comprising passing carbon monoxide through the ore bed for 5–30 minutes and then passing through the ore bed for 5–30 minutes, while withdrawing vaporized iron chlorides and other vaporized metal chlorides.

2. The process of claim 1 wherein the chlorine and carbon monoxide are separately introduced into the reactor to a point below the bed of ore and at a rate where the ore bed is fluidized, and below the rate where entrainment of beneficiate particles occurs.

3. The process of claim 1 wherein the temperature within the reactor is 850° C. to 1,090° C.

4. The process of claim 1 wherein the temperature within the reactor is 950° to 1,050° C.

5. The process of claim 1 wherein the depth of the ore bed is 1.0 to 5 feet.

6. The process of claim 1 wherein the depth of the ore bed is 0.1 to 1.0 feet.

7. The process of claim 1 wherein the gas flow rate is 0.19 to 2 feet/second.

8. The process of claim 1 wherein the gas flow rate is 0.19 to 1.25 feet/second.

9. The process of claim 1 wherein the carbonylation and chlorination cycle is repeated 3–12 times.

10. The process of claim 1 wherein the carbonylation and chlorination cycle is repeated 3–10 times.

11. The process of claim 1 wherein the carbonylation and chlorination cycle is repeated 3–6 times.

12. The process of claim 1 wherein each carbon monoxide-chlorine cycle comprises passing carbon monoxide through the ore for 20 to 30 minutes and then passing chlorine through the ore for 20 to 30 minutes.

* * * * *